(12) United States Patent
Pfeifle

(10) Patent No.: US 8,700,661 B2
(45) Date of Patent: Apr. 15, 2014

(54) FULL TEXT SEARCH USING R-TREES

(75) Inventor: Martin Pfeifle, Seewald (DE)

(73) Assignee: Navteq B.V., Veldhoven (NL)

( * ) Notice: Subject to any disclaimer, the term of this patent is extended or adjusted under 35 U.S.C. 154(b) by 0 days.

(21) Appl. No.: 13/445,483

(22) Filed: Apr. 12, 2012

(65) Prior Publication Data

US 2013/0275454 A1 Oct. 17, 2013

(51) Int. Cl.
*G06F 17/30* (2006.01)
(52) U.S. Cl.
USPC .......... 707/771; 707/706; 707/736; 707/758; 706/10; 706/12; 706/14; 706/15
(58) Field of Classification Search
None
See application file for complete search history.

(56) References Cited

U.S. PATENT DOCUMENTS

| | | | |
|---|---|---|---|
| 5,710,915 A | 1/1998 | McElhiney | |
| 5,852,821 A | 12/1998 | Chen et al. | |
| 6,778,981 B2* | 8/2004 | Lee et al. | 1/1 |
| 6,868,410 B2* | 3/2005 | Fortin et al. | 706/45 |
| 7,231,388 B2 | 6/2007 | Matsubayashi et al. | |
| 7,305,382 B2 | 12/2007 | Kobayashi | |
| 7,426,507 B1 | 9/2008 | Patterson | |
| 7,707,139 B2 | 4/2010 | Okamoto et al. | |
| 8,046,347 B2 | 10/2011 | Joshi | |
| 8,150,823 B2 | 4/2012 | Hamano et al. | |
| 8,214,387 B2 | 7/2012 | King et al. | |
| 8,407,216 B2 | 3/2013 | Walker et al. | |
| 8,489,624 B2 | 7/2013 | King et al. | |
| 8,554,786 B2 | 10/2013 | Yano et al. | |
| 2002/0188581 A1* | 12/2002 | Fortin et al. | 706/20 |
| 2003/0097356 A1* | 5/2003 | Lee et al. | 707/3 |
| 2004/0215641 A1* | 10/2004 | Kothuri et al. | 707/100 |
| 2005/0187916 A1 | 8/2005 | Levin et al. | |
| 2007/0106500 A1 | 5/2007 | Loofbourrow et al. | |
| 2008/0016066 A1 | 1/2008 | Kuznetsov et al. | |
| 2008/0040384 A1 | 2/2008 | Kuznetsov | |

(Continued)

FOREIGN PATENT DOCUMENTS

| | | |
|---|---|---|
| EP | 2306333 | 4/2011 |
| WO | WO2008005809 | 1/2008 |

OTHER PUBLICATIONS

Hearst et al., Tilebars: Visualization of Term Distribution Information in Full Text Information Access, May 7-11, 1995, pp. 59-66, Human Factors in Computing Systems, '95 Conference Proceedings, Denver, CO.

(Continued)

*Primary Examiner* — Hung Le
(74) *Attorney, Agent, or Firm* — Lempia Summerfield Katz LLC

(57) ABSTRACT

A method and system for full text search (FTS) using a navigation system is disclosed. The FTS system generates vectors for documents that are stored in a database. The vectors are formed by converting data token pairs to binary or hexadecimal strings. The FTS system may generate and store vectors in a multi-dimensional index (e.g., an R-Tree) for each document stored in the database. The FTS system may receive two or more search terms inputted by a user and generate one or more vectors based on the inputted search terms. The FTS system may then use the generated vectors to query the multi-dimensional index.

20 Claims, 10 Drawing Sheets

(56) References Cited

U.S. PATENT DOCUMENTS

| | | | |
|---|---|---|---|
| 2008/0059462 A1 | 3/2008 | Millett et al. | |
| 2010/0010977 A1 | 1/2010 | Choi et al. | |
| 2010/0049765 A1* | 2/2010 | Asher et al. | 707/723 |
| 2010/0077001 A1 | 3/2010 | Vogel et al. | |
| 2010/0169361 A1* | 7/2010 | Chen et al. | 707/769 |
| 2010/0205175 A1 | 8/2010 | Dole | |
| 2010/0217753 A1 | 8/2010 | Shlomot et al. | |
| 2010/0306227 A1 | 12/2010 | Fleming et al. | |
| 2010/0325011 A1* | 12/2010 | Foster et al. | 705/26.7 |
| 2011/0004599 A1* | 1/2011 | Deninger et al. | 707/747 |
| 2011/0044599 A1* | 2/2011 | Kowalczyk et al. | 385/135 |
| 2011/0113064 A1 | 5/2011 | Govindachetty et al. | |
| 2012/0158696 A1* | 6/2012 | Arasu et al. | 707/715 |
| 2013/0159320 A1* | 6/2013 | Gao et al. | 707/748 |

OTHER PUBLICATIONS

International Search Report and Written Opinion for PCT/EP2013/056454, mailed May 7, 2013.

Shi Lei et al., Building a Protein Name Dictionary from Full Text: A Machine Learning Term Extraction Approach, Apr. 7, 2005, vol. 6, No. 1, BMC Bioinformatics, Biomed Central, London, GB.

Anonymous, Z-Order Curve, Apr. 1, 2011, http://en.wikipedia.ord/wiki/Z-order_curve.

International Search Report and Written Opinion for related applcation PCT/EP2012/072545, mailed Mar. 13, 2013.

International Search Report and Written Opinion for related PCT Application No. PCT/EP2012/072544, Mailed Apr. 10, 2013.

Oosterom et al., Spatial Location Code, Aug. 12, 1996, www.gdmc.nl/oosterom/slc.pdf.

* cited by examiner 1
65843
DEUTSCHLAND
NAVTEQ
OTTO
STRASSE
SULZBACH
VOLGER

FIG. 7

(1, 65843) (1, DEUTSCHLAND) (1, NAVTEQ) (1, OTTO) (1, STRASSE) (1, SULZBACH) (1, VOLGER)

(65843, DEUTSCHLAND) (65843, NAVTEQ) (65843, OTTO) (65843, STRASSE) (65843, SULZBACH) (65843, VOLGER)

(DEUTSCHLAND, NAVTEQ) (DEUTSCHLAND, OTTO) (DEUTSCHLAND, STRASSE) (DEUTSCHLAND, SULZBACH) (DEUTSCHLAND, VOLGER)

(NAVTEQ, OTTO) (NAVTEQ, STRASSE) (NAVTEQ, SULZBACH) (NAVTEQ, VOLGER)

(OTTO, STRASSE) (OTTO, SULZBACH) (OTTO, VOLGER)

(STRASSE, SULZBACH) (STRASSE, VOLGER)

(SULZBACH, VOLGER)

FIG. 8

FULL TEXT SEARCH USING R-TREES

FIELD

The present invention relates generally to full text search, and more particularly, relates to full text search using R-Trees.

BACKGROUND

Full text search (FTS) systems search for relevant documents based on key words entered by a system user. The user enters a set of terms, referred to as tokens, and the FTS system finds documents containing all of the terms in the set. In order to support queries efficiently, the FTS system typically uses inverted indexes. For example, Lucene (described at http://lucene.apache.org/) and SQLite's FTS module (described at http://www.sqlite.org/cvstrac/wiki?p=FtsUsage) are both FTS systems that use inverted indexes.

An inverted index assigns a set of document identifiers to each token. The document identifiers are associated with documents that include the token at least once. Upon receiving a search request, the FTS system selects the set of document identifiers for each token in the request and then compares the document sets to each other. If a document identifier is contained in all document sets, the FTS system provides the document identifier in a result set of all identifiers contained in all document sets.

From a logical point of view, the inverted index can be regarded as a relation InvertedIndex(Token, DocID) with an combined index on Token and DocID. The inverted index allows the FTS system to efficiently execute queries such as Query 1:

SELECT DocID FROM InvertedIndex WHERE Token='Neuschwanstein'

If only a small number of documents belong to the result set, the FTS system's performance is generally good. If a user searches for documents that contain two terms 'Bavaria' and 'Neuschwanstein,' the FTS system executes a query such as Query 2:

SELECT DocID FROM InvertedIndex WHERE Token='Bavaria'
INTERSECT
SELECT DocID FROM InvertedIndex WHERE Token='Neuschwanstein'

Assume a database has one million documents containing the term 'Bavaria' and ten documents containing the term 'Neuschwanstein.' Although the size of the result set for Query 2 is equal to the size of the result set for Query 1, Query 2 takes much longer as the FTS system has to iterate over one million document identifiers belonging to the term 'Bavaria.'

While the inverted index works well in some applications, there is still room for improvement. For example, when documents contain only a few words other full search text system designs may provide faster query response times.

SUMMARY

A method and system for performing a full text search (FTS) that may increase search query speed is described. The FTS system may receive at least two search terms inputted by a user. Based on the received search terms, the FTS system may generate one or more token pairs and one or more query ranges based on the token pairs. The FTS system may then use the generated token pair and/or the query range to query a multi-dimensional index. Executing a search using a token pair may be faster and more efficient than separately executing a search using the underlying data tokens.

These as well as other aspects and advantages will become apparent to those of ordinary skill in the art by reading the following detailed description, with reference where appropriate to the accompanying drawings. Further, it is understood that this summary is merely an example and is not intended to limit the scope of the invention as claimed.

BRIEF DESCRIPTION OF THE DRAWINGS

Presently preferred embodiments are described below in conjunction with the appended drawing figures, wherein like reference numerals refer to like elements in the various figures, and wherein:

FIG. 7 is a depiction of a lexicographically-ordered set of data tokens, according to an example;

FIG. 8 is a depiction of a set of generated token pairs, according to an example;

DETAILED DESCRIPTION

The method and system for performing full text search as described herein may be performed on any computing platform, such as a navigation system, a server, a personal computer, a mobile telephone, and so on. A navigation system example is provided for purposes of explaining the details of the full text search system. However, it is understood that this is a non-limiting example.

I. Navigation System

Figure 1:
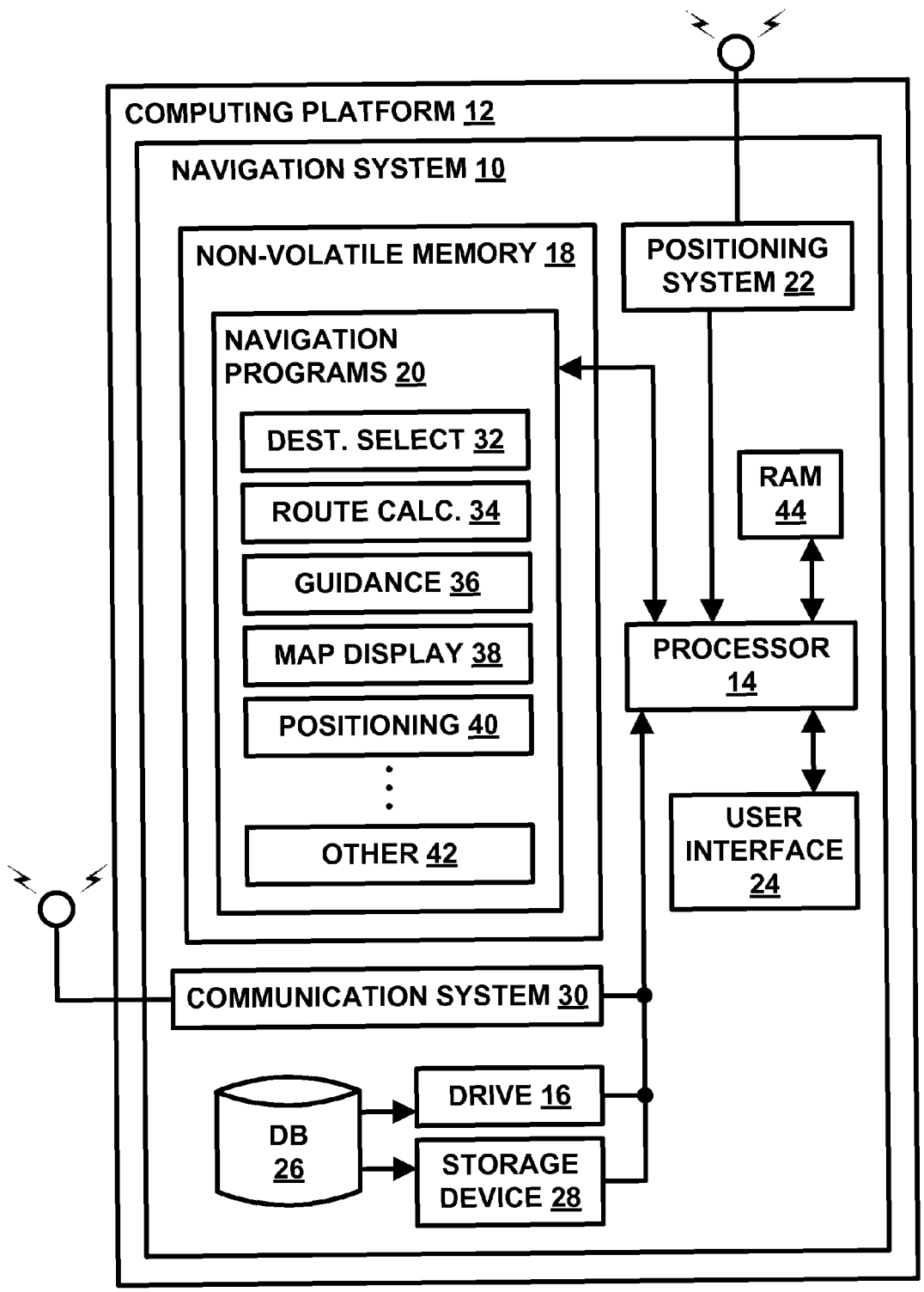
FIG. 1 is a block diagram depicting a navigation system, according to an example.

FIG. 1 is a block diagram of a navigation system 10 associated with a computing platform 12. The computing platform 12 may be associated with a vehicle. Additionally, the computing platform 12 may be a personal digital assistant (PDA), mobile telephone, personal computer, or any other computer. The navigation system 10 is a combination of hardware and software components. In one embodiment, the navigation system 10 includes a processor 14, a drive 16 connected to the processor 14, and a non-volatile memory storage device 18 for storing navigation application software programs 20 and possibly other information.

The navigation system 10 also includes a positioning system 22. The positioning system 22 may utilize GPS-type technology, a dead reckoning-type system, or combinations of these or other systems, all of which are known in the art. The positioning system 22 may include suitable sensing devices that measure the traveling distance speed, direction, orientation, and so on. The positioning system 22 may also include a GPS system. The positioning system 22 outputs a signal to the processor 14. The navigation application software programs 20 that run on the processor 14 use the signal from the positioning system 22 to determine the location, direction, orientation, etc., of the computing platform 12.

The navigation system 10 also includes a user interface 24 that allows the end user to input information into the navigation system 10 and obtain information from the navigation system 10. The input information may include a request for navigation features and functions of the navigation system 10. To provide navigation features and functions, the navigation system 10 uses a geographic database 26.

In one embodiment, the geographic database 26 is stored on a storage medium, such as a CD-ROM or DVD, that is installed in the drive 16 so that the geographic database 26 can be read and used by the navigation system 10. In one embodiment, the navigation system 10 also includes a storage device 28, such as a hard disk or memory card, on which a portion of the geographic database 26 is stored. In another embodiment, the geographic database 26 is stored on a hard disk. In one embodiment, the geographic database 26 may be a geographic database published by NAVTEQ North America, LLC of Chicago, Ill. The geographic database 26 does not have to be physically provided at the location of the navigation system 10. In alternative embodiments, some or the entire geographic database 26 may be located remotely from the rest of the navigation system 10 and portions of the geographic data provided via a communications system 30, as needed.

In one exemplary type of system, the navigation application software programs 20 load from the non-volatile memory storage device 18 into a random access memory (RAM) 44 associated with the processor 14. The processor 14 also receives input from the user interface 24. The navigation system 10 uses the geographic database 26 stored on the storage medium and/or storage device 28, possibly in conjunction with the outputs from the positioning system 22 and the communications system 30, to provide various navigation features and functions. The navigation application software programs 20 may include separate applications (or subprograms) that provide the various navigation-related features and functions. The navigation functions and features may include destination selection 32 (identifying one or more places to be used as a destination based on user input), route calculation 34 (determining a route from an origin to a destination), route guidance 36 (providing detailed directions for reaching a destination), map display 38, and positioning 40 (e.g., map matching). Other functions and programming 42 may be included in the navigation system 10.

The navigation application software programs 20 may be written in a suitable computer programming language such as C, although other programming languages, such as C++ or Java, are also suitable. All of the components described above may be conventional (or other than conventional) and the manufacture and use of these components are known to those of skill in the art.

II. Geographic Database

Figure 2:
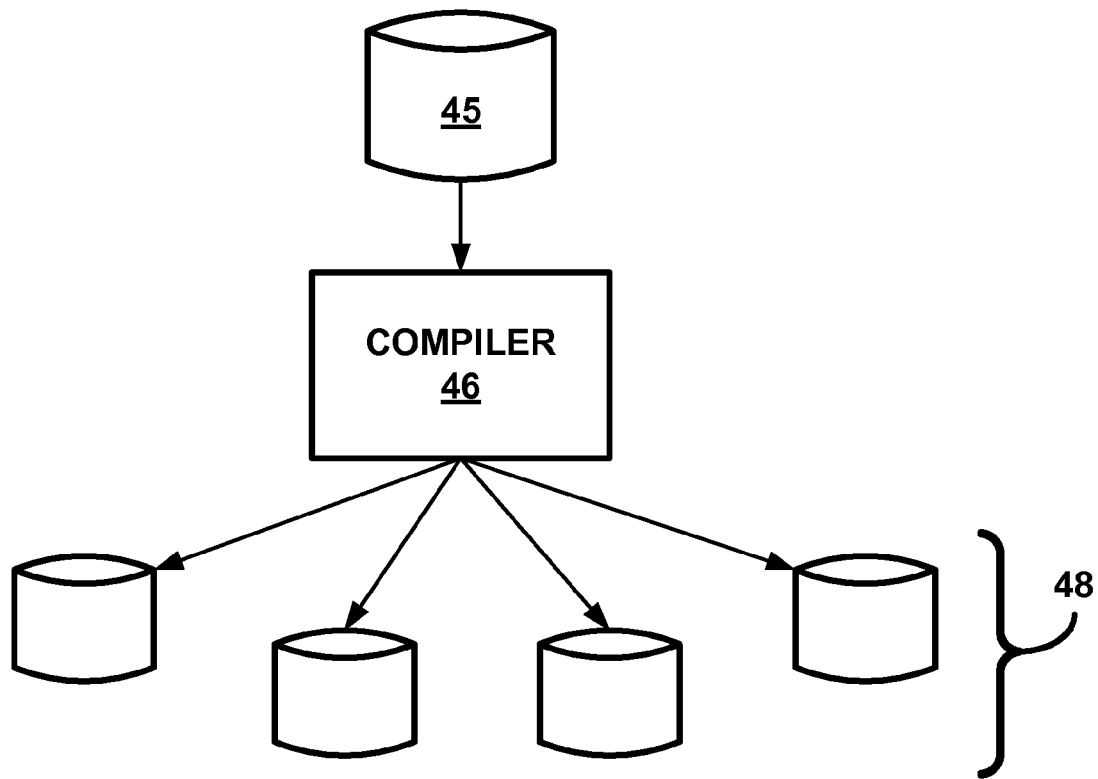
FIG. 2 is a block diagram that illustrates forming geographic database products from a master version of a geographic database, according to an example.

The geographic database 26 is a compiled database product, which is produced directly or indirectly from a master version of a geographic database. FIG. 2 shows a master version of a geographic database 45. The master version of the geographic database 45 contains data that represent geographic features in a coverage area. The coverage area may correspond to an entire country, such as the United States. Alternatively, the coverage area may correspond to several countries, such as the United States, Canada, and Mexico, or France, Germany, and Italy, and so on. According to another alternative, the coverage area of the master version of the geographic database 45 may represent only a single region within a country, such as the West Coast or the Midwest of the U.S. Although the master version of the geographic database 45 includes data that represent geographic features in the entire coverage area, there may be parts of the coverage area that contain geographic features that are not represented by data in the geographic database, or for which the representation of geographic features is sparse.

The master version of the geographic database 45 includes data about a road network located in the coverage area. The data about the road network include various kinds of information, such as the geographic coordinates of positions of the roads, street names of the roads, addresses ranges along the roads, turn restrictions at intersections of roads, and so on. The master version of the geographic database 45 also includes data about points of interest in the covered area. Points of interest may include hotels, restaurants, museums, stadiums, offices, automobile dealerships, auto repair shops, etc. The master version of the geographic database 45 may include data about the locations of these points of interests. The master version of the geographic database 45 may also include data about places, such as cities, towns, or other communities. The master version of the geographic database 45 may include other kinds of information.

The master version of the geographic database 45 is maintained as the copy that has the most up-to-date data relating to the coverage area. Accordingly, the master version of the geographic database 45 is updated, expanded, and/or otherwise modified on a regular and continuing basis. To facilitate these operations, the master version of the geographic database 45 is stored in a format that facilitates updating, maintenance, and development. For example, the data in the master version 45 may be uncompressed. Examples of suitable formats include Oracle Spatial and VSAM although other formats, both proprietary and non-proprietary, including GDF, may be suitable.

In general, the format of the master database 45 is not suitable for use in systems that provide navigation functions, such as navigation systems.

The master version of the geographic database 45 is used to make compiled database products 48, one example of which is the geographic database 26 depicted in FIG. 1. In one method of operation, data from the master version of the geographic database 45 is first compiled into an intermediate or delivery format, such as GDF. Then, the database in the delivery format is used to make the compiled database products 48. The compiled database products 48 are made using a compiler 46. The compiler 46 is a software program run on an appropriate computer platform. The compiler 46 obtains geographic data from the intermediate format database (which was formed from the master geographic database 45) and organizes the data into a format (or formats) to produce the compiled (or working) version of the geographic databases 48. The format of the compiled geographic databases 48 facilitates use of the geographic data in the end users' systems for navigation-related purposes.

The compiled database products 48 may include only portions of all the data in the master version of the geographic database 45. For example, the compiled database products 48 may include data that relate to only one or more specific sub-areas within the coverage area of the master version of the geographic database 45. Further, the compiled database products 48 may include fewer than all the data attributes that describe geographic features represented in the master version of the geographic database 45.

The compiled database products 48 are used on various kinds of computing platforms. For example, the compiled database products 48 are used in navigation systems (such as in-vehicle navigation systems and hand-held portable navigation systems), personal computers (including desktop and notebook computers), and other kinds of devices, such as pagers, telephones, personal digital assistants, tablets, smartphones, etc. The compiled database products 48 are also used on networked computing platforms and environments, including systems connected to the Internet.

The compiled database products 48 are stored on media that are suitable for the hardware platforms on which they are used. For example, the compiled database products may be stored on CD-ROM disks, hard drives, DVD disks, flash memory, or other types of media that are available now or that become available in the future.

In the compiled databases 48, the geographic data are organized differently than in the master version of the geographic database 45. A compiled database is organized, arranged, structured and stored in a form that facilitates the use of the data in the computing platform in which it is installed. A compiled database 48 may also be stored in a compressed format on the media on which it is located. An example of how the road network is represented in a compiled database product 48 is provided with reference to FIGS. 3 and 4.

Figure 3:
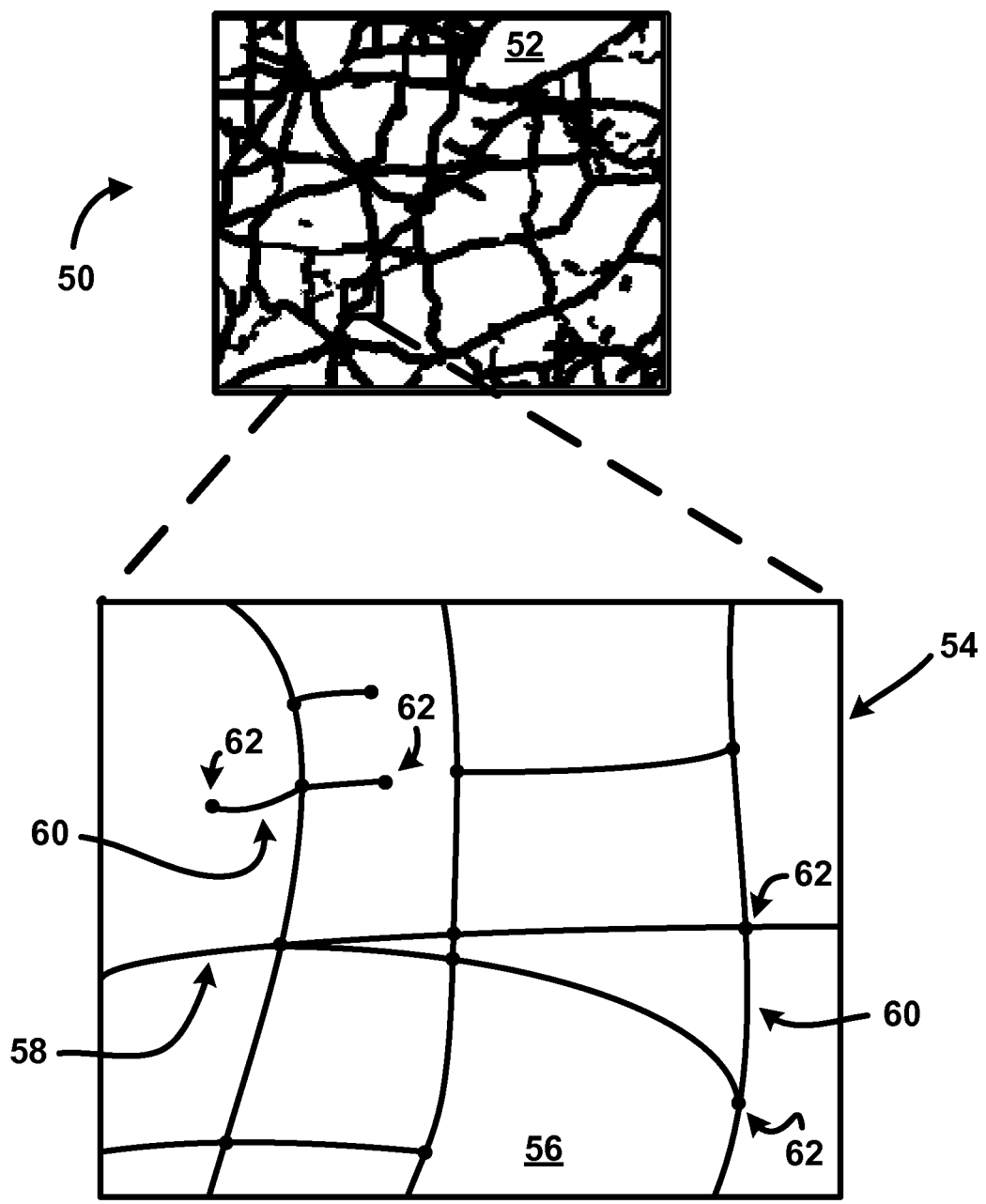
FIG. 3 depicts a map of a geographic region, according to an example.

FIG. 3 shows a map 50 of a geographic region 52. The geographic region 52 may correspond to a metropolitan or rural area, a state, a country, or combinations thereof, or any other area of comparable size. Located in the geographic region 52 are physical geographic features, such as roads, points of interest (including businesses, facilities, etc.), lakes, rivers, railroads, municipalities, etc.

FIG. 3 also includes an enlarged map 54 of a portion 56 of the geographic region 52. The enlarged map 54 illustrates part of the road network 58 in the geographic region 52. The road network 58 includes, among other things, roads and intersections located in the geographic region 52. As shown in the portion 56, each road in the geographic region 52 is composed of one or more road segments 60. A road segment 60 represents a portion of the road. Each road segment 60 is shown to have associated with it two nodes 62; one node represents the point at one end of the road segment and the other node represents the point at the other end of the road segment. The node at either end of a road segment may correspond to a location at which the road meets another road, i.e., an intersection, or where the road dead-ends.

Figure 4:
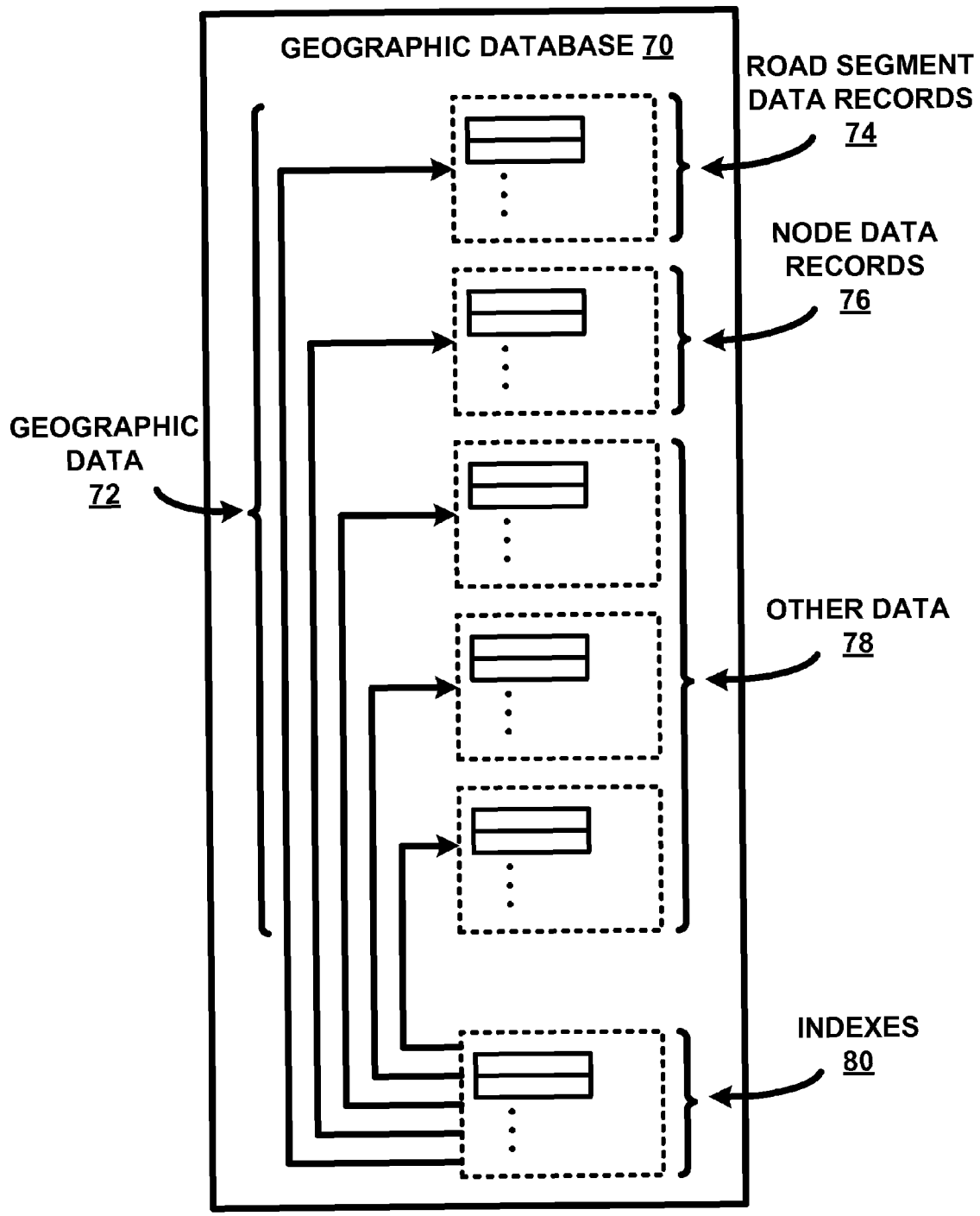
FIG. 4 is a block diagram of a geographic database that represents the geographic region of FIG. 3, according to an example.

Referring to FIG. 4, a geographic database 70 contains data 72 that represents some of the physical geographic features in the geographic region (52 in FIG. 3). Geographic database 70 may constitute all or part of geographic database 26. For example, geographic database 70 may be a subset of the data contained within geographic database 26. Geographic database 70 may be accessible through navigation system 10 and computing platform 12. Alternatively or additionally, geographic database 70 may be a standalone database located remotely from geographic database 26, navigation system 10, and/or computing platform 12 but nonetheless accessible via communication system 30 and/or processor 14.

The data 72 contained in the geographic database 70 includes data that represent the road network 58. In the embodiment of FIG. 4, the geographic database 70 that represents the geographic region 52 contains at least one database record 74 (also referred to as "entity" or "entry") for each road segment 60 in the geographic region 52 in FIG. 3. The road segment data record 74 may include a segment ID by which the data record can be identified in the geographic database 70.

Each road segment data record 74 has associated with it information (such as "attributes", "fields", etc.) that describes features of the represented road segment. The road segment data record 74 may include data that indicate the restrictions, if any, on the direction of vehicular travel permitted on the represented road segment, data indicating a speed limit or speed category (i.e., the maximum permitted vehicular speed of travel) on the represented road segment, data indicating whether the represented road segment is part of a controlled access road (such as an expressway), a ramp to a controlled access road, a bridge, a tunnel, a toll road, a ferry, and so on.

The road segment data record 74 also includes data providing the geographic coordinates (e.g., the latitude and longitude) of the endpoints of the represented road segment and data providing the shape of the road segment. In one embodiment, the endpoint data are references to the node data records 76 that represent the nodes corresponding to the endpoints of the represented road segment.

The road segment data record 74 may also include or be associated with other data that refer to various other attributes of the represented road segment. The various attributes associated with a road segment may be included in a single road segment record, or may be included in more than one type of record that are cross-referenced to each other. For example, the road segment data record 74 may include data identifying what turn restrictions exist at each of the nodes that correspond to intersections at the ends of the road portion represented by the road segment, the name or names by which the represented road segment is known, the street address ranges along the represented road segment, and so on.

The geographic database 70 that represents the geographic region 52 also includes a database record 76 (or "entity" or "entry") for each node 62 in the geographic region 52. (The terms "nodes" and "segments" represent only one terminology for describing these physical geographic features and other terminology for describing these features is intended to be encompassed within the scope of these concepts). Each of the node data records 76 may have associated information (such as "attributes", "fields", etc.) that allows identification of the road segment(s) that connect to it and/or its geographic position (e.g., its latitude and longitude coordinates).

The geographic database 70 may also include other kinds of data 78. The other kinds of data 78 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. Each point of interest has a unique physical location and each of the locations can be identified by its two dimensional (or three dimensional) geographic coordinates, (i.e., latitude, longitude, and optionally altitude). Additionally, the locations may correspond to one of the nodes or may correspond to a point along a road segment.

The geographic database 70 also includes indexes 80. The indexes 80 may include various types of indexes that relate the different types of data to each other or that relate to other aspects of the data contained in the geographic database 70. One of the indexes is a multi-dimensional index, which is described with respect to FIGS. 5-10.

III. Full Text Search System

A. Overview

Figure 5:
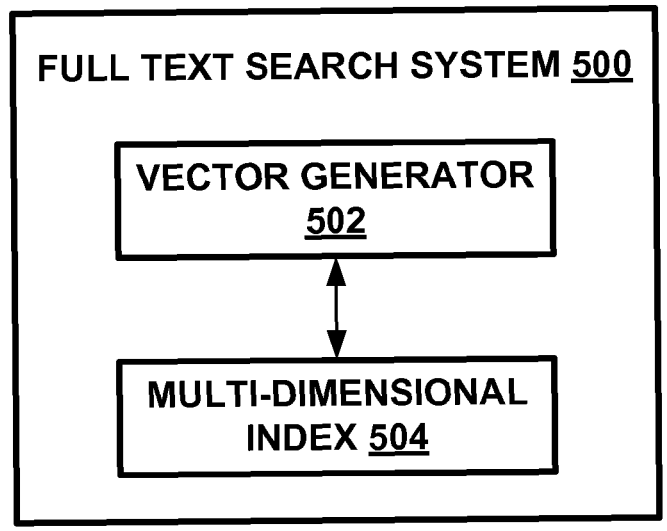
FIG. 5 is a block diagram of a full text search system, according to an example.

FIG. 5 is a block diagram of a full text search (FTS) index creation system 500. The FTS index creation system 500 may be embodied as program instructions stored on a non-transitory computer-readable medium (CRM), which when executed by a processor cause the processor to carry out function as described further herein. The FTS index creation system 500 may be embodied as a processor coupled to memory storage. The memory storage may have stored thereon program instructions, which when executed by the processor causes the FTS index creation system 500 to carry out functions as described herein. Any such program instructions may be written in a suitable computer programming language such as C, C++, Java, or any other suitable program language now known or later developed. In the navigation system example, the FTS index creation system 500 may be part of or accessible to the compiler 46.

The FTS index creation system 500 includes a vector generator 502 and a multi-dimensional index 504. The vector generator 502 may be implemented as a software sub-module or collection of program instructions. The vector generator 502 generates vectors based on an input of two or more data tokens. The multi-dimensional index 504 indexes multi-dimensional information. Preferably, the multi-dimensional index 504 is implemented as an R-tree; however, X-trees, IQ-trees, Quadtrees, or other multi-dimensional structures may be used. The multi-dimensional index 504 associates document identifiers with vectors generated by the vector generator 502.

FTS systems search for relevant documents based on the entered data tokens. The term document in this context means any kind of electronic data record or file that contains text. In the example of a navigation system, relevant documents may be a segment, node, point of interest, or other record stored in a geographic database.

B. Index Creation

In the navigation system example, index creation may occur during the compilation process of generating geographic database products as shown in FIG. 2. In other examples, the index may be created and stored on any computing platform prior to operation (i.e., querying) of the FTS system.

Table 1 shows data for two point of interest documents. Table 1 associates point of interest identifiers (POIID) with data tokens (DATA). POI 1 is associated with eight data tokens: "Navteq," "Otto," "Volger," "Strasse," "1," "65843," "Sulzbach," and "Deutschland." POI 2 is associated with five data tokens: "Pizzeria," "Claudio," "Deutschgasse," "5," and "Sulzbach."

TABLE 1

| POI Data | |
|---|---|
| POIID | DATA |
| 1 | Navteq |
| | Otto-Volger-Strasse 1 |
| | 65843 Sulzbach |
| | Deutschland |
| 2 | Pizzeria Claudio |
| | Deutschgasse 5 |
| | Sulzbach |
| ... | ... |

The FTS index creation system 500 creates vectors that may be more selective than the data tokens. The vectors are generated using at least two data tokens that are associated with a document, such as the point of interest documents shown in Table 1. The vectors may facilitate window queries, which may be more efficient than typical FTS queries.

Figure 6:
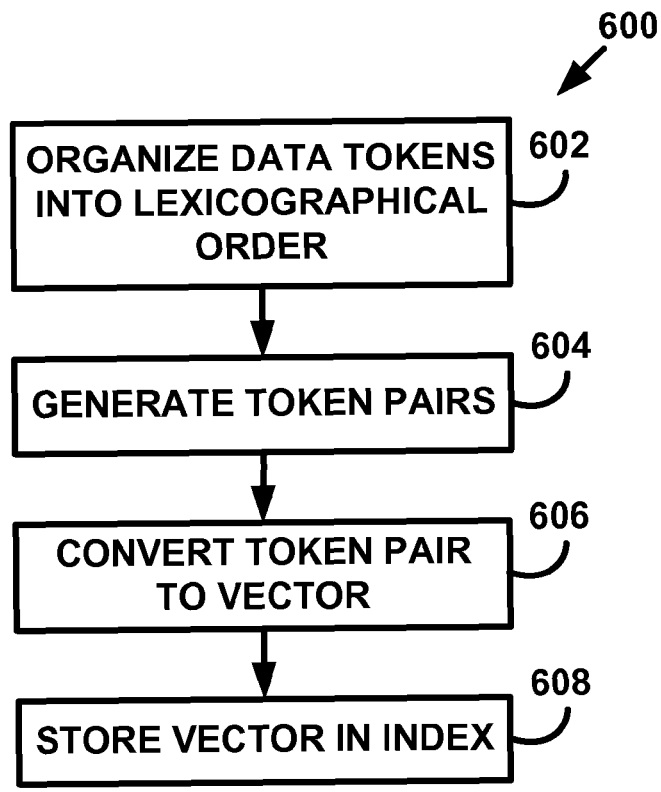
FIG. 6 is a flow diagram of a method of creating a multi-dimensional index for the full text search system depicted in FIG. 5, according to an example.

FIG. 6 is a flow diagram of a method 600 for generating the multi-dimensional index 504. At block 602, the vector generator 502 organizes data tokens of a document into lexicographical order. For example, the vector generator 502 may arrange the six data tokens of POI 1 (namely, "1," "65843," "DEUTSCHLAND," "NAVTEQ," "OTTO," "STRASSE," "SULZBACH," and "VOLGER") into lexicographical order as shown in FIG. 7.

At block 604, the vector generator 502 generates token pairs from the lexicographically-ordered set of data tokens. A token pair generally comprises a first data token and a second data token in the form of an ordered pair as follows:

(first data token, second data token).

The first data token of a token pair may be referred to as the X-coordinate of the token pair, whereas the second data token of a token pair may be referred to as the Y-coordinate of the token pair.

Token pairs may be generated by combining the first data token in a lexicographically-ordered set of data tokens with each subsequent data token in the lexicographically-ordered set, individually combining the second data token in the lexicographically-ordered set with each subsequent data token in the lexicographically-ordered set, and so on. For example, the vector generator 502 generates the token pairs of FIG. 8 from the lexicographically-ordered set of data tokens in FIG. 7.

As depicted in FIG. 8, the first data token, "1" is combined with each of the seven subsequent data tokens: "65843," "DEUTSCHLAND," "NAVTEQ," "OTTO," "STRASSE," "SULZBACH," and "VOLGER." The second data token, "65843" is combined with each of the six subsequent data tokens: "DEUTSCHLAND," "NAVTEQ," "OTTO," "STRASSE," "SULZBACH," and "VOLGER." The third data token, "DEUTSCHLAND" is combined with each of the five subsequent data tokens: "NAVTEQ," "OTTO," "STRASSE," "SULZBACH," and "VOLGER." The fourth data token "NAVTEQ" is combined with each of the four subsequent data tokens: "OTTO," "STRASSE," "SULZBACH," and "VOLGER." The fifth data token "OTTO" is combined with each of the three subsequent data tokens: "STRASSE," "SULZBACH," and "VOLGER." The sixth data token "STRASSE" is combined with each of the two subsequent data tokens "SULZBACH," and "VOLGER." And the seventh data token "SULZBACH" is combined with the one subsequent data token "VOLGER."

As a general matter, in any set of n tokens, there will be $$\frac{n*(n-1)}{2}$$

token pairs. In the example illustrated by FIGS. 7-8, there are eight data tokens and, therefore, $$\frac{8*(7)}{2} = 28$$

token pairs.

At block 606, the vector generator 502 converts the token pairs into a two-dimensional vectors using the binary, hexadecimal, or other numerical value of the token pairs. This conversion may facilitate storage of the particular token pair into a suitable database structure. For example, referring to the token pair (DEUTSCHLAND, OTTO), the vector generator 502 may convert the string "DEUTSCHLAND" to the hexadecimal value "44 45 55 54 53 43 48 4C 41 4E 44" or the binary value:

01000100 01000101 01010101 01010100 01010011 01000011 01001000 01001100 01000001 01001110 01000100.

In addition, the vector generator 502 may convert the string "OTTO" to the hexadecimal value 4F 54 54 4F or the binary value:

01001111 01010100 01010100 01001111.

Additionally, the vector generator 502 may also make a determination of whether each string has a length greater than, equal to, or less than a predetermined number of bytes. Typically, the predetermined number of bytes is eight; however, other values are possible as well. If a string length is greater than the predetermined number of bytes, the vector generator 502 truncates the string such that the length of the string is equal to the predetermined number of bytes. If a string length is less than the predetermined number of bytes, the vector generator 502 appends at least one zero-byte to the string such that the length of the string is equal to the predetermined number of bytes. If a string length is equal to the predetermined number of bytes, the vector generator 502 may not append or truncate anything from the string. Depending on the implementation, the vector generator 502 may make this determination, as well as any subsequent appending or truncation to a string, before or after the vector generator 502 converts the string to binary or hexadecimal form.

Referring again to the token pair (DEUTSCHLAND, OTTO), the vector generator 502 converts the token pair to its binary form:

(01000100 01000101 01010101 01010100 01010011 01000011 01001000 01001100 01000001 01001110 01000100, 01001111 01010100 01010100 01001111)

or its hexadecimal form (44 45 55 54 53 43 48 4C 41 4E 44, 4F 54 54 4F). In either case, the vector generator 502 determines that the binary or hexadecimal value of the string "DEUTSCHLAND" is longer than the example predetermined length of eight bytes. In response, the vector generator 502 truncates the binary or hexadecimal value after the eighth byte. In addition, the vector generator 502 determines that the binary or hexadecimal value of the string "OTTO" is shorter than the example predetermined length of eight bytes. In response, the vector generator 502 appends four zero-bytes to the binary or hexadecimal value so that it becomes eight bytes in length. Thus, the binary version of the two-dimensional vector becomes:

(01000100 01000101 01010101 01010100 01010011 01000011 01001000 01001100, 01001111 01010100 01010100 01001111 00000000 00000000 00000000 00000000)

and the hexadecimal version of the two-dimensional vector becomes: 44 45 55 54 53 43 48 4C, 4F 54 54 4F 00 00 00 00. The vector generator 502 may convert each token pair generated at block 604 into two-dimensional vectors.

At block 608, the vector generator 502 stores the two-dimensional vectors in the multi-dimensional index 504. Optionally, the FTS index creation system 500 may create the multi-dimensional index 504 if one does not already exist. For example, an appropriate command to create an R-Tree table may be as follows:

CREATE VIRTUAL TABLE rtreePOIs USING rtree(id, X, Y).

Then, the FTS index creation system 500 may store a two-dimensional vector into the R-Tree using a command having the form:

INSERT INTO rtreePOIs values (id, X, Y), where id is the POI ID, X is the binary or hexadecimal value of the X-coordinate of the two-dimensional vector, and Y is the binary or hexadecimal value of the Y-coordinate of the two-dimensional vector.

By way of example, the vector generator 502 may insert into the multi-dimensional index 504 the hexadecimal version of the two-dimensional vector for the token pair (DEUTSCHLAND, OTTO), by a command as follows:

INSERT INTO rtreePOIs values (1, 44 45 55 54 53 43 48 4C, 4F 54 54 4F 00 00 00 00).

These examples and other examples provided herein use SQLite syntax. However, depending on the implementation, other suitable commands and data structures may be used as well.

Using the example in Table 1, the vector generator 502 inserts into the multi-dimensional index 504 each generated two-dimensional vector for both POI 1 and POI 2. As described above, the number of generated token pairs for a POI depends on the number of tokens associated with the POI and is given by the expression $$\frac{n*(n-1)}{2}.$$

The example POI 1 is associated with eight data tokens, whereas the example POI 2 is associated with five data tokens. Thus, if all possible two-dimensional vectors for POI 1 and POI 2 are stored in the multi-dimensional index 504, the multi-dimensional index 504 would contain $$\frac{8*7}{2} + \frac{5*4}{2} = 38$$

vectors.

Figure 9:
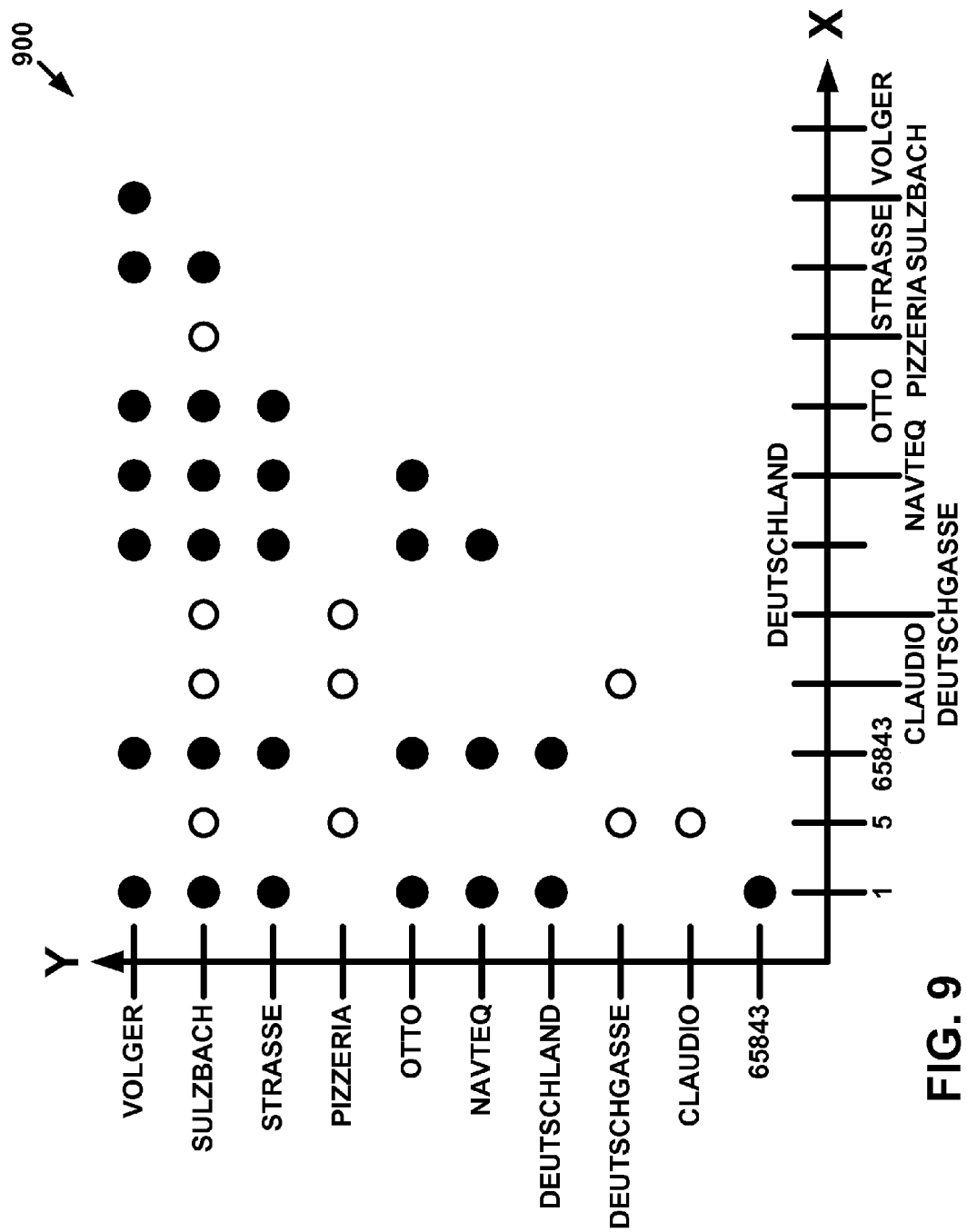
FIG. 9 is a graphical depiction of the multi-dimensional index depicted in FIG. 5, according to an example.

FIG. 9 depicts a graph 900 of the multi-dimensional index 504 after the vector generator 502 inserts the vectors into the multi-dimensional index 504. The first coordinate of a vector appears on the X-axis of the graph, whereas the second coordinate of a vector appears on the Y-axis of the graph. The vectors associated with POI 1 are represented with a black dot, whereas the vectors associated with POI 2 are represented with a white dot (or circle).

C. Query Processing

Figure 10:
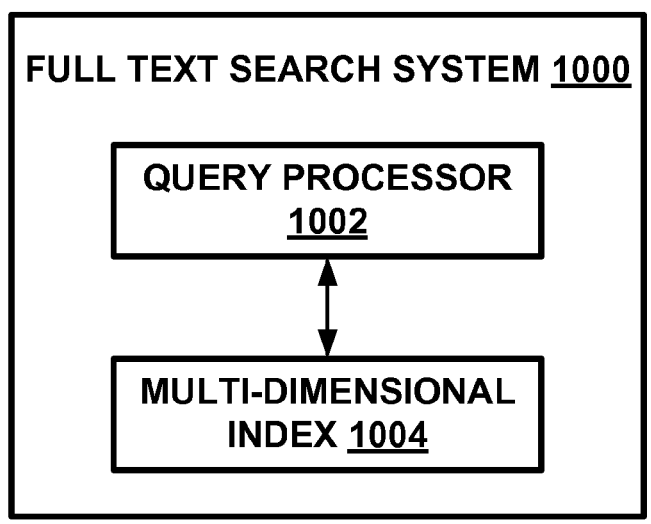
FIG. 10 is a block diagram of a full text search system, according to another example.

FIG. 10 is a block diagram of a full text search (FTS) system 1000. The FTS system 1000 includes a query processor 1002 and a multi-dimensional index 1004. The multi-dimensional index 1004 may be a copy of the multi-dimensional index 504 generated using the method 600. As previously described, in the navigation system example, the multi-dimensional index 1004 may be included in the indexes 80.

The query processor 1002 may be embodied as program instructions stored on a non-transitory computer-readable medium, which when executed by a processor cause the processor to carry out function as described further herein. Any such program instructions may be written in a suitable computer programming language such as C, C++, Java, or any other suitable program language now known or later developed.

In the navigation system example, the query processor 1002 may be part of the navigation programs 20 contained within the non-volatile memory 18 of the navigation system 10. For example, the query processor 1002 may be used in the navigation system 10 as part of destination selection. In this example, some or all of the query processor 1002 may be included as part of the destination selection program 32.

The FTS index creation system 500 and the FTS system 1000 may be combined into a single FTS system. They are shown separately because some functions of the query processor 1002 are not needed during index creation and some functions of the vector generator 502 are not needed during query processing. Additionally, as described with the navigation system example, the components of the FTS index creation system 500, 1000 do not need to be co-located as shown in FIGS. 5 and 10. The multi-dimensional index 1004 may be the same as the multi-dimensional index 504 once the index creation process is completed.

Figure 11:
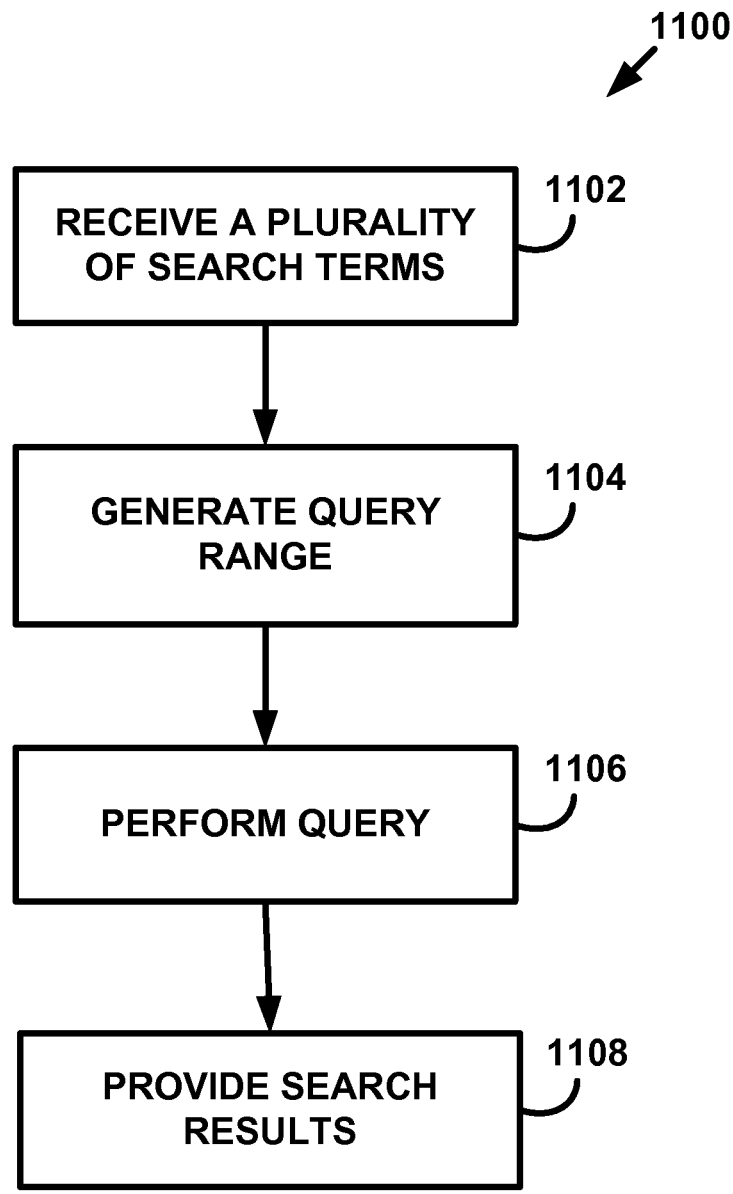
FIG. 11 is a flow diagram of a method of performing a full text search using the full text search system depicted in FIG. 10, according to an example.

FIG. 11 is a flow diagram of a method 1100 for full text search. At block 1102, the FTS system 1000 receives search terms (sometimes referred to as tokens) from a user. For example, the user may be a user of the navigation system 10 and the query terms are words that relate to a desired destination or point of interest (e.g., street name, point of interest name, category, or part of an address). The user may enter the search terms via the user interface 24.

At block 1104, the query processor 1002 generates a query range for each received search term. The query range includes a lower-bound token pair and an upper-bound token pair. To generate the query range, the query processor 1002 may first generate a token pair based on two received search terms in a similar manner as the vector generator 502.

For example, if the FTS system 1000 receives the search terms "SULZBACH" and "DEU," the query processor 1002 generates the token pair (DEU, SULZBACH). In one embodiment, the "DEU" token constitutes the X-coordinate of the token pair because it has a higher lexicographical order than "SULZBACH." The query processor 1002 converts the token pair into a two-dimensional vector having a binary or hexadecimal value in a similar manner as the vector generator 502. For example, the hexadecimal form of the token pair (DEU, SULZBACH) is (44 45 55, 53 55 4C 5A 42 41 43 48). From this vector, the query processor 1002 generates the lower-bound token pair and the upper-bound token pair to form a query range.

To generate the lower-bound token pair, the query processor 1002 may make a determination of whether each data token in the token pair has a length greater than, equal to, or less than a predetermined number of bytes. As described above, the typical value for the predetermined number of bytes is eight bytes; however, other values are possible as well. For any data token of the token pair that has a length longer than the predetermined number of bytes, the query processor 1002 generates the lower-bound token pair by truncating that data token such that the length of the data token in the lower-bound token pair is equal to the predetermined length. For any data token of the token pair that has a length shorter than the predetermined number of bytes, the query processor 1002 generates the lower-bound token pair by appending at least one zero-byte to that data token such that the length of that data token in the lower-bound token pair is equal to the predetermined length. For any data token that has a length equal to the predetermined number of bytes, the query processor 1002 generates the lower-bound query token by not appending or truncating anything to that data token.

Referring back to the example token pair (DEU, SULZBACH) or two-dimensional vector (44 45 55, 53 55 4C 5A 42 41 43 48), the query processor 1002 may generate a lower-bound query token by appending five zero-bytes to the first data token so that the length of the token equals the predetermined length (e.g., eight bytes). The query processor 1002 may not append anything to the second data token because its length already equals the predetermined length (e.g., eight bytes). The lower-bound query token becomes: (44 45 55 00 00 00 00 00, 53 55 4C 5A 42 41 43 48).

To generate the upper-bound query token, the query processor 1002 may rely on a similar determination as described with respect to generation of the lower-bound query token. For any data token of the token pair that has a length longer than the predetermined number of bytes, the query processor 1002 generates the upper-bound token pair by truncating that data token such that the length of the data token in the upper-bound token pair is equal to the predetermined length. For any data token of the token pair that has a length shorter than the predetermined number of bytes, the query processor 1002 generates the upper-bound token pair by appending at least one one-byte or FF-byte to that data token such that the length of that data token in the upper-bound token pair is equal to the predetermined length. For any data token that has a length equal to the predetermined number of bytes, the query processor 1002 generates the upper-bound query token by not appending or truncating anything to that data token.

Referring again to the example token pair (DEU, SULZBACH) or the two-dimensional vector (44 45 55, 53 55 4C 5A 42 41 43 48), the query processor 1002 may generate an upper-bound token pair by appending five FF-bytes to the first data token so that it equals the predetermined length (e.g., eight bytes). The query processor 1002 may not append anything to the second data token because it already has a length that equals the predetermined length (e.g., eight bytes). The upper-bound token pair becomes: (44 45 55 FF FF FF FF FF, 53 55 4C 5A 42 41 43 48).

The combination of this lower-bound token pair and upper-bound token pair is referred to as the query range and takes the form ((44 45 55 00 00 00 00 00, 53 55 4C 5A 42 41 43 48), (44 45 55 FF FF FF FF FF, 53 55 4C 5A 42 41 43 48)). The query range encompasses two query ranges, a first query range for the X-coordinate of the original token pair and a second query range for the Y-coordinate of the original token pair. The first query range spans from 44 45 55 00 00 00 00 00 to 44 45 55 FF FF FF FF FF, whereas the second query range spans from 53 55 4C 5A 42 41 43 48 to 53 55 4C 5A 42 41 43 48. Those skilled in the art will note that the second query range is essentially a single value because its length was equal to the predetermined number of bytes.

Figure 12A:
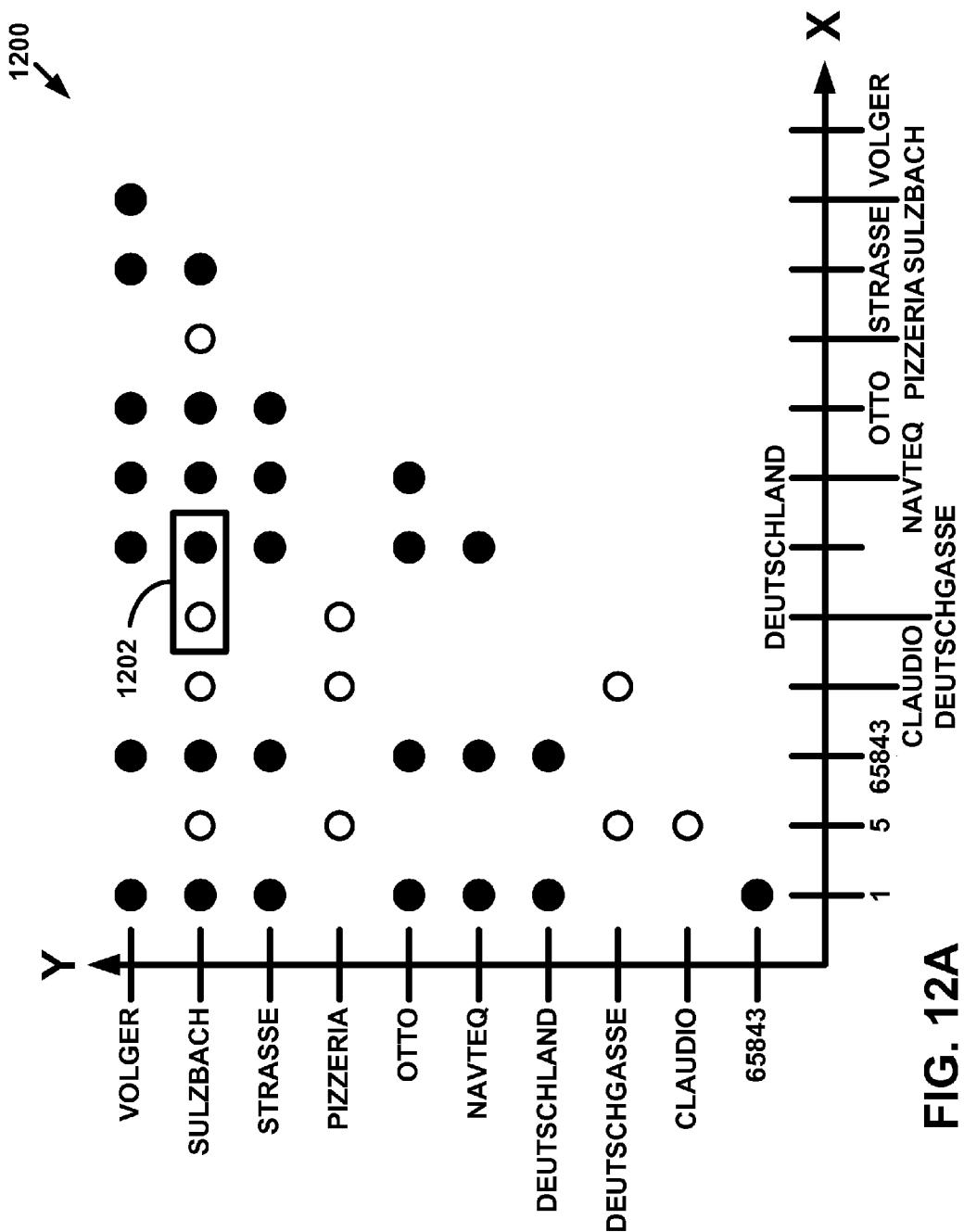
FIGS. 12A and 12B depict search windows on the graphical depiction of FIG. 9, according to an example.

This query range essentially forms a query window in which the lower left corner of the window is defined by the lower-bound token pair and the upper right corner of the window is defined by the upper-bound token pair. This window is depicted on graph 1200 in FIG. 12A as window 1202. The window 1202 is shown as encompassing or "windowing" two vectors stored in the multi-dimensional index 504, 1004 as depicted in the graph 900. The first token pair, (DEUTSCHGASSE, SULZBACH), is represented by the white dot (or circle) in the window 1202 and is associated with POI 2. And the second token pair, (DEUTSCHLAND, SULZBACH), is represented by the black dot in the window 1202 and is associated with POI 1.

At block 1106, the query processor 1002 performs a query of the multi-dimensional index using the generated query range. For example, the query processor 1002 may issue a window query of the form:

SELECT id FROM rtreePOIs WHERE X BETWEEN x'44 45 55 00 00 00 00 00' AND x'44 45 55 FF FF FF FF FF' AND Y BETWEEN x'53 55 4C 5A 42 41 43 48' AND x'53 55 4C 5A 42 41 43 48', where x' denotes that the following value is a hexadecimal value. In this example, as depicted by window 1202, the document identifiers for both POI 1 and POI 2 are returned because each POI is associated with a two-dimensional vector that falls within the window (also referred to as the query range).

At block 1108, the query processor 1002 provides the result set of document identifiers associated with the window query. The query processor 1002 may provide the result set to another system, which then retrieves the documents and provides the documents to the user. Alternatively, the query processor 1002 may retrieve the documents associated with the document identifier and then provide the documents to the user.

For example, the query processor 1002 may provide the point of interest identifiers, POI 1 and POI 2, to the map display application 38, which then retrieves data from the geographic database 26 associated with POI 1 and POI 2. The map display application 38 may then display a map that identifies a location and possibly other data associated with POI 1 and POI 2 on the user interface 24.

D. Additional Examples

Several other queries are possible depending on the type and number of search terms a user enters and the FTS system 1000 consequently receives at block 1102. According to one additional example, the FTS system 1000 may receive at block 1102 three entered search terms. For example, the received search terms may be "N," "SULZBACH," and "DEU." The FTS system 1000 may generate three different query ranges for each possible token pair (i.e., for (DEU, N), (DEU, SULZBACH), and (N, SULZBACH)).

Figure 12B:
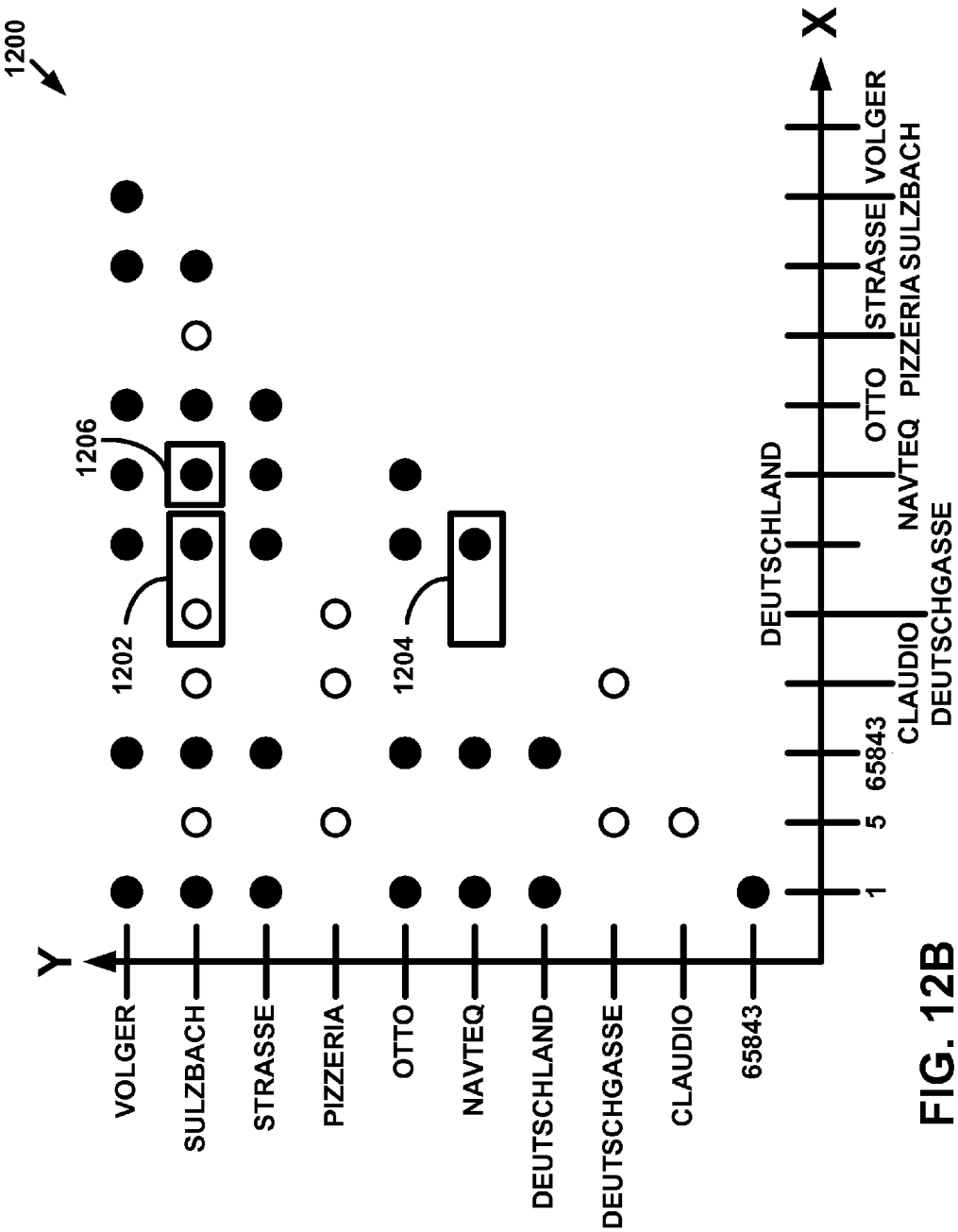

In FIG. 12B, the query range for (DEU, N) is depicted as window 1204, the query range for (DEU SULZBACH) is depicted as window 1202, and the query range for (N, SULZBACH) is depicted as window 1206. In hexadecimal form, the query range for (DEU, N) is (44 45 55 00 00 00 00 00, 4E 00 00 00 00 00 00 00), (44 45 55 FF FF FF FF FF, 4E FF FF FF FF FF FF FF)). The query range for (DEU, SULZBACH) is ((44 45 55 00 00 00 00 00, 53 55 4C 5A 42 41 43 48), (44 45 55 FF FF FF FF FF, 53 55 4C 5A 42 41 43 48)). The query range for (N, SULZBACH) is ((4E 00 00 00 00 00 00 00, 53 55 4C 5A 42 41 43 48), (4E FF FF FF FF FF FF FF, 53 55 4C 5A 42 41 43 48)).

Accordingly, the FTS system 1000 may issue queries for all three query ranges as follows:

SELECT id FROM rtreePOIs WHERE X BETWEEN x'44 45 55 00 00 00 00 00' AND x'44 45 55 FF FF FF FF FF' AND Y BETWEEN x'4E 00 00 00 00 00 00 00' AND x'4E FF FF FF FF FF FF FF'

INTERSECT

SELECT id FROM rtreePOIs WHERE X BETWEEN x'44 45 55 00 00 00 00 00' AND x'44 45 55 FF FF FF FF FF' AND Y BETWEEN x'53 55 4C 5A 42 41 43 48' AND x'53 55 4C 5A 42 41 43 48'

INTERSECT

SELECT id FROM rtreePOIs WHERE X BETWEEN x'4E 00 00 00 00 00 00 00' AND x'4E FF FF FF FF FF FF FF' AND Y BETWEEN x'53 55 4C 5A 42 41 43 48' AND x'53 55 4C 5A 42 41 43 48'.

Those skilled in the art will note that the number of subqueries carried out depends on the number of search tokens received at block 1102 and is given by the above-described expression $$\frac{n*(n-1)}{2}.$$

IV. Alternative Embodiments

One more of the following alternative embodiments may be used in place of or in combination with any of the above-disclosed embodiments as well as any of the hereinafter-described alternative embodiments as appropriate.

A. Token Triples

As described above, token pairs may be generated based on two data tokens. The FTS index creation system 500, 1000 may also generate token triples (or other multiples of tokens). The FTS index creation system 500, 1000 may generate token triples based on each unique combination of three data tokens associated with a document and may store the token triples in the multi-dimensional index 504, 1004 as a three dimensional R-Tree. For example, referring to POI 2 in Table 1, the FTS index creation system 500, 1000 may generate token triples of the form (5, CLAUDIO, DEUTSCHGASSE), (5, CLAUDIO, PIZZERIA), (5, CLAUDIO, SULZBACH), (CLAUDIO, DEUTSCHGASSE, PIZZERIA), (CLAUDIO, DEUTSCHGASSE, SULZBACH), (DEUTSCHGASSE, PIZZERIA, SULZBACH).

As a general matter, for any set of n tokens for which to generate combinations of d tokens (e.g., d has a value of two for token pairs, three for token triples, and so on), the number of generated entries in the database is given by the expression:

$$\frac{n!}{(n-d)!*d!}.$$

Thus, for a document having five associated data tokens, the FTS index creation system 500, 1000 generates $$\frac{5!}{(5-3)! * 3!} = 10$$

token triples.

In a similar fashion, if a user enters three or more search terms via navigation system 10 and the FTS system 1000 consequently receives three or more search terms, the FTS system 1000 may generate at least one token triple and corresponding query range in accordance with the process described above. For example, if a user entered the search terms "DEU," "N," and "SULZBACH," the FTS system 1000 may generate a three-dimensional vector and corresponding query range as follows: (DEU, N, SULZBACH), ((44 45 55 00 00 00 00 00, 4E 00 00 00 00 00 00 00, 53 55 4C 5A 42 41 43 48), (44 45 55 FF FF FF FF FF, 4E FF FF FF FF FF FF FF, 53 55 4C 5A 42 41 43 48)). Accordingly, the FTS system 1000 may issue a window query of the form:

SELECT id FROM rtreePOIs WHERE X BETWEEN x'44 45 55 00 00 00 00 00' AND x'44 45 55 FF FF FF FF FF' AND Y BETWEEN x'4E 00 00 00 00 00 00 00' AND x'4E FF FF FF FF FF FF FF' AND Z BETWEEN x'53 55 4C 5A 42 41 43 48' AND x'53 55 4C 5A 42 41 43 48'.

B. Location Based Extensions

The methods and system described herein may be utilized in conjunction with location based search techniques. For instance, instead of or in addition to two-dimensional token pairs, the FTS index creation system 500 may generate a vector based on a combination of at least two data tokens and at least one location value. A location value may be a latitude value associated with a point of interest or map tile, a longitude value associated with a point of interest or map tile, or a Morton code value associated with a point of interest or map tile (which may be generated by interweaving latitude and longitude values together). For example, the FTS index creation system 500 may generate token triples for a document in the form:

(first data token, second data token, Morton code value).

The FTS index creation system 500 may store a three-dimensional vector in the multi-dimensional index 504 in accordance with the process previously described.

According to another example, the FTS index creation system 500 may generate token quadruples for a document in the form:

(first data token, second data token, latitude value, longitude value).

The FTS index creation system 500 may store a four-dimensional vector in the multi-dimensional index 504 in accordance with the process previously described.

Accordingly, a user may be viewing a particular map tile presented by navigation system 10 via user interface 24 and may enter at least two search terms. Consequently, the FTS index creation system 500 may receive the two search terms and may determine at least one location value associated with the viewed map tile (e.g., a Morton code value or a set of latitude and longitude coordinates). The FTS index creation system 500 may generate a vector based on the received search terms and the location value, generate a query range based on the vector, and query a database.

For example, a user may enter "DEU" and "SULZBACH" while viewing a particular map tile. Consequently, the FTS index creation system 500 may receive the search terms and determine a set of latitude and longitude values associated with the viewed map tile. For example, one pair of latitude and longitude values may correspond to the bottom left corner of a viewed map tile, whereas another pair of latitude and longitude values may correspond to the top right corner of the viewed map tile. Such a set of latitude and longitude values may be, for example, ((48.33434, 12.34556), (49.33434, 13.34556)). In accordance with the above-described process, the FTS index creation system 500 may generate a four-dimensional vector and a query range, and issue a corresponding window query as follows:

SELECT id FROM rtreePOIs WHERE X BETWEEN x'44 45 55 00 00 00 00 00' AND x'44 45 55 FF FF FF FF FF' AND Y BETWEEN x'53 55 4C 5A 42 41 43 48' AND x'53 55 4C 5A 42 41 43 48' AND LONGITUDE BETWEEN 12.34556 AND 13.34556 AND LATITUDE BETWEEN 48.33434 AND 49.33434.

C. Proprietary Database Structures

In addition to storing token pairs and other generated tokens in a database indexed by one or more R-Trees, those skilled in the art will understand that such data tokens may be stored in any proprietary database structure or proprietary file structure. Such database or file structure may not be based on SQL, but instead on any suitable proprietary algorithm in accordance with the entirety of the present disclosure.

V. Conclusions

The FTS systems 500, 1000 and the methods 600 and 1100 may increase query processing speed. As a result, the FTS systems 500, 1000 and the methods 600 and 1000 may be beneficial during destination selection with a navigation system. However, based on this disclosure, those skilled in the art will realize that the FTS systems 500, 1000 and the methods 600 and 1100 may be used in navigation systems for other full text search applications.

Moreover, the FTS systems 500, 1000 and the methods 600 and 1100 may be used in other systems that perform full text searches, especially those that search documents that consist of a few words (e.g., less than fifteen). For instance, the FTS systems 500, 1000 and the methods 600 and 1100 may be used for full text search of musical pieces, which may be represented by the artist's name, the title, genre, and so on. If a user enters relatively unselective tokens, such as CLASSICAL, MADONNA, and LOVE, the vectors will be much more selective. As another example, book searching may also be facilitated using vectors.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A computer-implemented method for facilitating full-text search, the method comprising:
  receiving a plurality of search terms;
  generating a query range for each received search term, wherein the query range includes a lower-bound token pair and an upper-bound token pair;
  querying a multi-dimensional index using the query range; and
  receiving from the multi-dimensional index, based on the querying, a result set that is associated with the plurality of search terms.

2. The method of claim 1, further comprising:
  for each unique combination of two search terms in the plurality of search terms, wherein each unique combination of two search terms comprises a first search term and a second search term, generating (i) the lower-bound token pair by combining a lower-bound search value that corresponds to the first search term and a lower-bound search value that corresponds to the second search term, and (ii) the upper-bound token pair by combining an upper-bound search value that corresponds to the first search term and an upper-bound search value that corresponds to the second search term.

3. The method of claim 1, further comprising:
for each unique combination of three search terms in the plurality of search terms, wherein each unique combination of three search terms comprises a first search term, a second search term, and a third search term, generating (i) the lower-bound token pair by combining a lower-bound search value that corresponds to the first search term, a lower-bound search value that corresponds to the second search term, and a lower-bound search value that corresponds to the third search term, and (ii) the upper-bound token pair by combining an upper-bound search value that corresponds to the first search term, an upper-bound search value that corresponds to the second search term, and an upper-bound search value that corresponds to the third search term.

4. The method of claim 1, further comprising:
converting at least one search term from the plurality of search terms into a binary or hexadecimal string;
determining that the string has a length that is less than a threshold number of bytes; and
in response to the determining step, generating a query range that corresponds to the string by:
generating a lower-bound search value by appending at least one zero-byte to the string such that the lower-bound search value has a length equal to the threshold number of bytes, and
generating an upper-bound search value by appending at least one one-byte to the string such that the upper-bound search value has a length equal to the threshold number of bytes.

5. The method of claim 1, further comprising:
converting at least one search term from the plurality of search terms into a binary or hexadecimal string;
determining that the string has a length that is greater than a threshold number of bytes; and
in response to the determining step, generating a query range that corresponds to the string by:
generating a lower-bound search value by truncating the string such that the lower-bound search value has a length equal to the threshold number of bytes, and
generating an upper-bound search value by truncating the string such that the upper-bound search value has a length equal to the threshold number of bytes.

6. The method of claim 1, wherein the multi-dimensional index is an R-Tree.

7. The method of claim 1, wherein at least one of the plurality of search terms is a location value.

8. A computer-implemented method for facilitating full-text search, the method comprising:
organizing data tokens associated with a database entry into a lexicographically-ordered set of data tokens;
generating a token set based on a combination of at least two data tokens from the lexicographically-ordered set of data tokens;
converting the token set into a multi-dimensional vector;
storing the multi-dimensional vector in a multi-dimensional index such that the multi-dimensional vector is associated with the database entry; and
generating a query range from the multi-dimensional vector, wherein the query range includes a lower bound and an upper bound.

9. The method of claim 8, wherein converting the token set includes converting the data tokens in the token set into binary.

10. The method of claim 8, wherein converting the token set includes converting the data tokens in the token set into hexadecimal.

11. The method of claim 8, wherein the token set includes two data tokens and the multi-dimensional vector is a two-dimensional vector associated with a token pair.

12. The method of claim 8, wherein the token set includes three data tokens and the multi-dimensional vector is a three-dimensional vector associated with a token pair and a location value.

13. The method of claim 8, wherein the token set includes four data tokens and the multi-dimensional vector is a four-dimensional vector associated with a token pair, a latitude value, and a longitude value.

14. A navigation system comprising:
a processor; and
data storage containing instructions executable by the processor for carrying out destination selection functions, the functions including:
receiving a plurality of search terms;
generating a query range for each received search term, wherein the query range includes a lower-bound token pair and an upper-bound token pair;
querying a multi-dimensional index using the query range; and
receiving from the multi-dimensional index a result set of document identifiers associated with destinations.

15. The navigation system of claim 14, wherein the document identifiers associated with destinations are point of interest identifiers associated with point of interest records stored in the geographic database.

16. The navigation system of claim 14, wherein the data storage further contains instructions executable by the processor for carrying out map display functions, the functions including:
receiving the result set of document identifiers;
retrieving the documents associated with the document identifiers from the geographic database; and
displaying a map that identifies locations specified within the documents.

17. The navigation system of claim 16, wherein the documents are point of interest records in the geographic database and the point of interest records include location data associated with a point of interest.

18. The navigation system of claim 14, wherein the multi-dimensional index associates the document identifiers with vectors generated using at least two data tokens associated with a document.

19. The navigation system of claim 14, wherein the multi-dimensional index is an R-Tree.

20. The navigation system of claim 14, wherein at least one search term of the plurality of search terms is a location value.

* * * * *